US011162750B1

(12) United States Patent
Weeks et al.

(10) Patent No.: US 11,162,750 B1
(45) Date of Patent: Nov. 2, 2021

(54) DETECTION OF FIREARMS IN A SECURITY ZONE USING RADIO FREQUENCY IDENTIFICATION TAG EMBEDDED WITHIN WEAPON BOLT CARRIER

(71) Applicants: Donald L. Weeks, Palm City, FL (US); Randy Karr, Palm City, FL (US)

(72) Inventors: Donald L. Weeks, Palm City, FL (US); Randy Karr, Palm City, FL (US)

( * ) Notice: Subject to any disclaimer, the term of this patent is extended or adjusted under 35 U.S.C. 154(b) by 0 days.

(21) Appl. No.: 17/022,331

(22) Filed: Sep. 16, 2020

Related U.S. Application Data

(60) Provisional application No. 62/901,158, filed on Sep. 16, 2019.

(51) Int. Cl.
| | | |
|---|---|---|
| *G08B 13/14* | (2006.01) | |
| *F41A 17/06* | (2006.01) | |
| *G08B 21/02* | (2006.01) | |
| *H01Q 19/30* | (2006.01) | |
| *G06K 7/10* | (2006.01) | |

(Continued)

(52) U.S. Cl.
CPC ........ *F41A 17/063* (2013.01); *G06K 7/10297* (2013.01); *G06K 19/0723* (2013.01); *G08B 21/02* (2013.01); *H01Q 1/2216* (2013.01); *H01Q 19/30* (2013.01); *G06K 2007/10504* (2013.01)

(58) Field of Classification Search
CPC .............. F41A 17/063; G06K 7/10297; G06K 19/0723; G06K 2007/10504; G08B 21/02; H01Q 1/2216; H01Q 19/30
See application file for complete search history.

(56) References Cited

U.S. PATENT DOCUMENTS 6,132,306 A * 10/2000 Trompower ........... H04B 1/707
375/E1.002
6,219,952 B1   4/2001 Mossberg
(Continued)

OTHER PUBLICATIONS

Benez et al., Application of the RFID technology in the field of gun management for the Police of the Czech Republic (Year: 2012).*
(Continued)

*Primary Examiner* — Quang Pham
(74) *Attorney, Agent, or Firm* — Mark D. Bowen; Malin Haley DiMaggio & Bowen, P.A.

(57) ABSTRACT

A system and method for detecting the presence of firearms adapted with embedded RFID tags is disclosed. A plurality of RFID interrogators sequentially and intermittently transmit short burst interrogating signals thereby causing RFID tags within range to transmit a responsive signal which may be used to activate alarms and other security measures. RFID tags are configured using an ASIC chip enabled for 10 Ghz wireless communication. The ASIC chip is embedded within a bolt carrier that includes a slotted antenna aperture resulting in extended range wireless communication. A plurality of RFID interrogators are installed in an detection area and transmit a radio frequency signals which excite any RFID enabled devices within range causing the devices to generate and transmit a response signal which may be used to trigger a variety of security measures such as sounding an alarm, locking doors, contacting law enforcement, etc.

4 Claims, 4 Drawing Sheets

(51) Int. Cl.
*G06K 19/07* (2006.01)
*H01Q 1/22* (2006.01)

(56) References Cited

U.S. PATENT DOCUMENTS

| | | | |
|---|---|---|---|
| 6,226,913 B1 * | 5/2001 | Haimovich | F41A 17/063 42/1.01 |
| 6,421,013 B1 | 7/2002 | Chung | |
| 6,909,366 B1 * | 6/2005 | Marsh | G06K 7/0008 340/10.1 |
| 7,649,463 B2 | 1/2010 | Tuttle | |
| 8,107,446 B2 * | 1/2012 | Shoarinejad | H04W 76/40 370/338 |
| 8,169,322 B1 | 5/2012 | Zhan et al. | |
| 8,253,570 B1 * | 8/2012 | McBride | G08B 21/0275 340/572.4 |
| 8,469,281 B2 | 6/2013 | Mieslinger | |
| 8,904,689 B2 * | 12/2014 | Kountotsis | F41A 17/063 42/1.02 |
| 9,430,732 B2 | 9/2016 | Mats et al. | |
| 9,536,187 B2 | 1/2017 | Pantaloni | |
| 10,170,819 B2 | 1/2019 | Kim et al. | |
| 10,176,422 B2 | 1/2019 | Ennabli et al. | |
| 10,184,747 B1 * | 1/2019 | Courter | F41A 23/34 |
| 10,289,945 B1 | 5/2019 | Ramirez et al. | |
| 10,458,732 B2 * | 10/2019 | Neitzling | F41A 5/20 |
| 10,635,963 B2 | 4/2020 | Grove et al. | |
| 2003/0001725 A1 * | 1/2003 | Moore | G08B 13/2462 340/10.3 |
| 2003/0097586 A1 * | 5/2003 | Mok | G06K 17/00 726/7 |
| 2005/0262751 A1 * | 12/2005 | Leslie | F41A 17/063 42/70.01 |
| 2006/0064384 A1 * | 3/2006 | Mehrotra | G08B 13/19608 705/57 |
| 2006/0208857 A1 * | 9/2006 | Wong | F41C 33/029 340/5.82 |
| 2007/0103303 A1 * | 5/2007 | Shoarinejad | G01S 19/09 340/572.1 |
| 2008/0238685 A1 * | 10/2008 | Tuttle | G01S 13/74 340/572.7 |
| 2008/0303633 A1 * | 12/2008 | Cheng | G06K 7/10178 340/10.1 |
| 2009/0091428 A1 * | 4/2009 | Tuttle | G01S 13/751 340/10.2 |
| 2009/0091454 A1 * | 4/2009 | Tuttle | G01S 11/10 340/572.7 |
| 2010/0188211 A1 * | 7/2010 | Brommer | G06K 17/00 340/539.32 |
| 2012/0073178 A1 * | 3/2012 | Ivtsenkov | F41A 17/08 42/70.06 |
| 2012/0091821 A1 | 4/2012 | Kato et al. | |
| 2013/0009751 A1 * | 1/2013 | Sato | H04W 4/06 340/10.1 |
| 2013/0113669 A1 * | 5/2013 | Bellows | H01Q 19/104 343/764 |
| 2013/0307746 A1 | 11/2013 | Nakano et al. | |
| 2014/0176330 A1 | 6/2014 | Gerfast | |
| 2014/0184476 A1 * | 7/2014 | McHale | G02B 27/017 345/8 |
| 2014/0203913 A1 * | 7/2014 | Danzy | F41A 17/063 340/10.1 |
| 2014/0272806 A1 * | 9/2014 | Hunt | F41A 33/00 434/16 |
| 2014/0327541 A1 * | 11/2014 | Ani | G01S 19/16 340/539.13 |
| 2015/0075047 A1 | 3/2015 | August | |
| 2015/0077255 A1 * | 3/2015 | Pallotta | F41A 17/063 340/572.1 |
| 2017/0248383 A1 | 8/2017 | McLean | |
| 2018/0211718 A1 * | 7/2018 | Heath | A01K 29/005 |
| 2018/0216906 A1 * | 8/2018 | Gonzalez | G06K 19/07771 |
| 2019/0156074 A1 * | 5/2019 | Lee | G06K 7/10019 |
| 2020/0109913 A1 * | 4/2020 | Hanson | G09F 3/08 |
| 2020/0124368 A1 * | 4/2020 | Kujawski | F41G 11/003 |
| 2020/0250950 A1 * | 8/2020 | Gonzalez | G08B 13/2468 |

OTHER PUBLICATIONS

Douglas Weiss, Smart gun technologies One method of eliminating unauthorized firearm use (Year: 1994).*
Zhi Ying Xu, Design and Development of Weapons and Equipment Manage System Based on RFID Technology (Year: 2011).*
CMCID, Firearm-RFID (Year: 2021).*

* cited by examiner

DETECTION OF FIREARMS IN A SECURITY ZONE USING RADIO FREQUENCY IDENTIFICATION TAG EMBEDDED WITHIN WEAPON BOLT CARRIER

CROSS REFERENCE TO RELATED APPLICATIONS

This application claims the benefit of provisional U.S. Patent Application Ser. No. 62/901,158, filed on Sep. 16, 2019.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to detecting the presence of weapons entering a protected zone, and more particularly to the use of radio frequency identification (RFID) to detect the presence of a weapon adapted with an RFID tag.

2. Description of Related Art

Mass shootings have become a tragic reality throughout the world. There were more than 300 mass shootings in 2018 in the United States alone. Mass shootings have occurred in a variety of locations including shopping malls, schools, and places of worship. Often times these mass shootings occur in places (such as schools) and venues (such as concerts or theaters) where access is restricted to a small number of points of entry. Semi-automatic, assault-style weapons are commonly used in mass shootings, such as those which occurred in Newtown, Conn., Orlando, Fla., San Bernardino, Calif., and Las Vegas, Nev., due to their high firing rates and large magazines.

The proliferation of mass shooting tragedies has heightened the need for systems capable of detecting the presence of firearms such as assault style rifles upon entry within a designated area. In response, the background art reveals attempts directed to detecting the presence of weapons in proximity to areas wherein a high degree of security is desired.

A number of such attempts rely on the use of radio frequency identification (RFID) technology. RFID uses electromagnetic fields to automatically identify and locate tags attached to objects to be identified. So called "passive" RFID tags contain a chip with electronically stored information, and an antenna. Two-way radio transmitter-receivers or readers, also referred to as interrogators, generate a signal which is used by the tag to generate a response. In accordance with this method, the tag receives energy via electromagnetic waves propagated from the reader/antenna. Once the wave reaches the tag, the energy travels through the tag's internal antenna, and activates the chip. The energy is modulated with the chip's data, which contains identifying information that is unique to the chip/tagged object and flows back via the tag's antenna to the reader's antenna in the form of electromagnetic waves.

The background art reveals a number of attempts using radio frequency identification technology to aid in detecting the presence of firearms within designated areas. For example, U.S. Pat. No. 6,226,913, issued to Haimovich, discloses a weapon having an electronic tag which provides a unique identification of the weapon, wherein the tag is located so as to not be physically accessible to the user of the weapon as illustrated below. A detection system, including a transceiver, is provided to communicate with the tag via wireless transmission. The transceiver also communicates with a monitoring apparatus and/or an alarm apparatus. Published U.S. application to Leslie (Pub. No. US 2005/0262751) discloses a system for detecting the presence of firearms using RFID chips and a reader which transmits an interrogating signal from a distance thereby causing the RFID chip to send a responsive signal as illustrated below. Published U.S. application to Danzy (Pub. No. US 2014/0203913) discloses providing a tracking device, such as an RFID chip, embedded within a weapon such that the user would not be able to visually see the tracking device or easily remove it. The tracking device is monitored by a reader device which would collect data when the tracking device was in range.

The references disclosed in the background art suffer from a number of significant limitations and disadvantages that have resulted in limited effectiveness and commercial acceptance. A number of the background art attempts affix RFID tags on components of the weapon that are easily removable and interchangeable, such as the grip, thereby allowing for detection nullification and/or significantly limiting detection reliability. Other attempts are limited to use of a small number of RFID interrogators due radio frequency exposure limitations promulgated by the Federal Communications Commission (FCC) thereby limiting detection range and effectiveness. More particularly, FCC guidelines mandate limitations regarding RF exposure on humans. In view of the above, there remains a need in the art for advancements in the field of weapon detection using RFID technology.

Further RFID systems are burdened by very poor wireless communications range. In an attempt to overcome the range limitations, prior art RFID systems incorporate some form of a shortened dipole antenna, typically an antenna significantly less than % wavelength. When those antenna are mounted in proximity to metal, however, performance degrades significantly as the metal interrupts and cancels the electric and magnetic fields surrounding the antenna. These systems typically utilize non-microwave frequencies (i.e. frequencies below 1.0 Ghz), largely because the electrical components (e.g. transistors and chips) are less costly to fabricate for lower frequency applications, and further because microwave frequencies are generally considered most appropriate in short range applications. Accordingly, prior art RFID systems wherein the RFID tag is mounted on metal, so called on-metal applications suffer from significant range limitations.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

The present invention overcomes the limitations in the art by providing a system and method capable of detecting the presence of firearms adapted with embedded RFID tags and a plurality of RFID interrogators which sequentially and intermittently transmit short burst interrogating signals at various distances, angles, and orientations thereby causing RFID chips embedded with any firearm within range to transmit a responsive signal which may be used to activate alarms and other security measures. A first significant aspect of the present invention relates to embedding an RFID tag within the bolt carrier of the firearm. It is important that the RFID tag be affixed to the bolt carrier as that component is one that is essential to the operation of the firearm. It is also important that the RFID tag be coupled to the bolt carrier in a manner that is tamper-resistant to prevent removal thereof by a user. The RFID tag may further include an antenna in electrical communication therewith. In applications wherein the RFID tag is coupled to the bolt carrier internally, the antenna preferably extends from the RFID tag to a location external to the main bolt carrier body thereby improving interrogation signal reception.

In an alternate embodiment an RFID tag using microwave frequencies is mounted internally and a half wavelength antenna aperture is formed in the bolt carrier. In accordance with this embodiment the RFID tag comprises a sub flush ultra-thin 10 Ghz surface mounted tag. The use of a slotted antenna enables the RFID tag to be mounted below the outer surface of the bolt carrier. In addition, an application-specific integrated circuit ("ASIC") chip is provided and configured for long range detection. This configuration allows for mounted attachment of the RFID tag and ASIC chip assembly either flush with or below the external metal surface with the antenna slot facilitating signal reception and transmission. This embodiment has been found to achieve a 10-fold improvement in range as compared with prior art on-metal applications.

The present invention further includes a plurality of RFID interrogators which are installed in and around a designated area wherein protection and security are desired. The RFID interrogators transmit a radio frequency signals which excite any RFID tags within range causing the tags to generate a response signal which is then received by the interrogator. More particularly, passive tags collect energy from the interrogator and use that energy to generate and transmit a response signal which contains identifying information which is unique to the tagged object. The received signal may be used to trigger a variety of security measures such as sounding an alarm, locking doors, contacting law enforcement, etc. A significant aspect of the present invention involves providing a plurality of RFID interrogators and staggering periodic interrogation transmissions such that not all of the interrogators are transmitting simultaneously.

Accordingly, it is an object of the present invention to provide advancements in the field of security and detection range and orientations.

It is another object of the present invention to provide systems and methods for detecting the presence of firearms using RFID technology.

Still another object of the present invention is to provide an RFID firearm detection system wherein an RFID tag is coupled to the bolt carrier.

Yet another object of the present invention is to improve upon on-metal RFID systems by providing 10 Ghz RFID tag configured with a half wavelength antenna aperture to achieve increased wireless communications range.

Yet another object of the present invention is to provide an RFID firearm detection system incorporating multiple RFID interrogators configured for sequential activation thereby minimizing RF exposure.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or maximum. Furthermore, such an interpretation should apply regardless of the breadth of the range or the characteristics being described.

Turning now to the drawings, FIGS. 1-6 depict and illustrate a system and method capable detecting the presence of firearms specifically adapted with RFID chips embedded within, and a detection system comprising a plurality of RFID interrogators which sequentially and intermittently transmit short burst interrogating signals thereby causing RFID chips embedded with any firearm within range to transmit a responsive signal which may be used to activate alarms and other security measures. The term "firearm" shall be broadly construed to encompass any type of weapon or gun.

Figure 1:
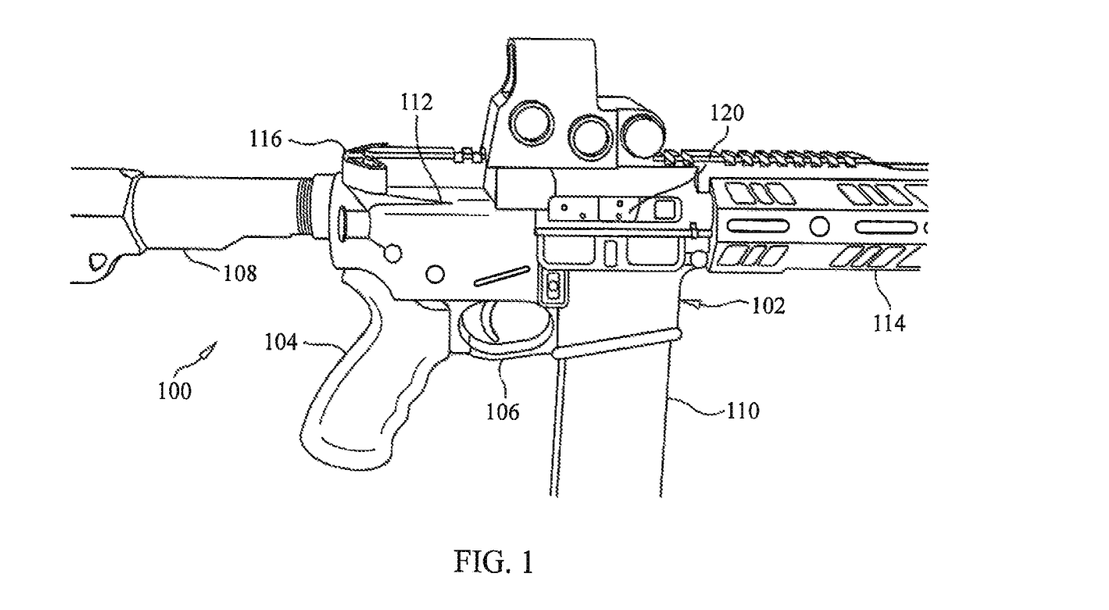
FIG. 1 is a partial photograph of an AR-15 firearm depicting the bolt carrier group.
Figure 2:
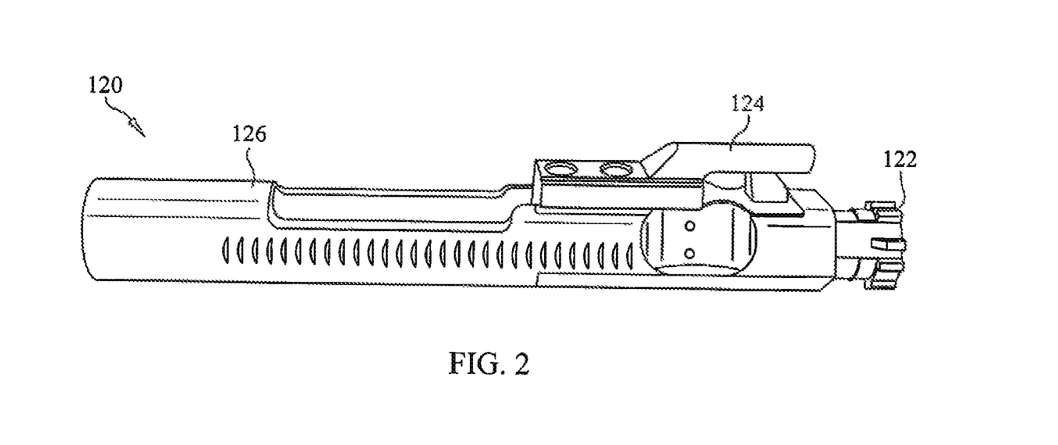
FIG. 2 is a photograph of the bolt carrier group.

FIG. 1 is a photographic illustration of a semi-automatic firearm, generally referenced as 100, of the type or style commonly used in mass shooting events. Firearm 100 includes a lower receiver, generally referenced as 102, including a pistol grip 104, trigger assembly 106, a buttstock 108, and an insertable and removable magazine 110. Firearm 100 further includes an upper receiver 112, including a barrel 114, a charging handle 116, and a bolt carrier group or bolt carrier, generally referenced as 120. While virtually all of the above-referenced components of firearm 100 may be removed and replaced during customization to suit the preferences of the user, the bolt carrier group 120 is the component is the least likely component to be replaced. FIG. 2 is a photographic depiction of the bolt carrier group 120, which includes a bolt assembly 122, a gas key 124, and a carrier body 126.

A first significant aspect of the present invention relates to embedding a passive RFID tag, generally referenced as 12 within the carrier body 126 of bolt carrier group 120. In a first embodiment, each RFID tag preferably includes a microprocessor chip including data storage (memory) and an antenna. It is important that the RFID tag be affixed by the bolt carrier component since this component is one that is both essential to the operation of the firearm and less likely to be replaced by aftermarket components, such as is the case with other firearm components, namely, grips, stocks, barrels, trigger assemblies, etc. Further, by affixing an RFID tag to the bolt carrier, the bolt carrier remains detectable even if it is installed on another firearm. In the first embodiment RFID tag 12 preferably complies to the EBC Global Gen 2 (ISO 18000-6C) International Standard. It should be noted, however, that any suitable communication standard or protocol is considered within the scope of the present invention. RFID tag 12 preferably utilizes 860-960 Mhz UHF channels which are legal under the FCC CFR-47, Part 15 rules. Each RFID tag includes a computer chip configured only to respond to property encoded interrogation signals using backscatter communication methods. Each RFID tag 12 includes a hard-coded serial number stored in memory that cannot be changed and may further contain any desirable additional information. While the present invention is primarily directed to affixing an RFID tag to the bolt carrier component, the use of RFID tags affixed to other parts of the firearm is considered within the scope of the present invention.

Figure 3:
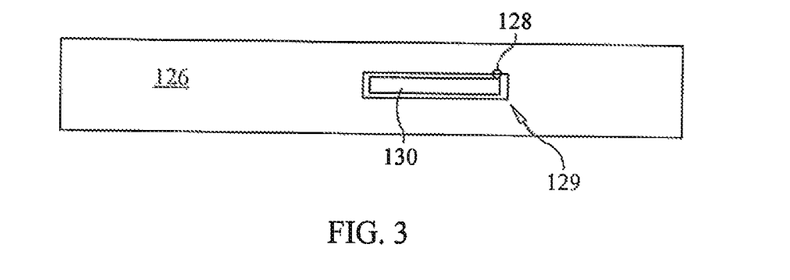
FIG. 3 is a schematic top view illustration of a bolt carrier adapted with an RFID tag assembly in accordance with the present invention.
Figure 4:
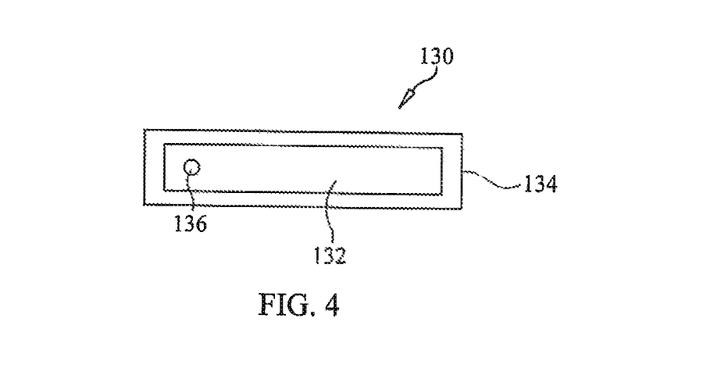
FIG. 4 is a detailed top view of the RFID tag assembly.
Figure 5:
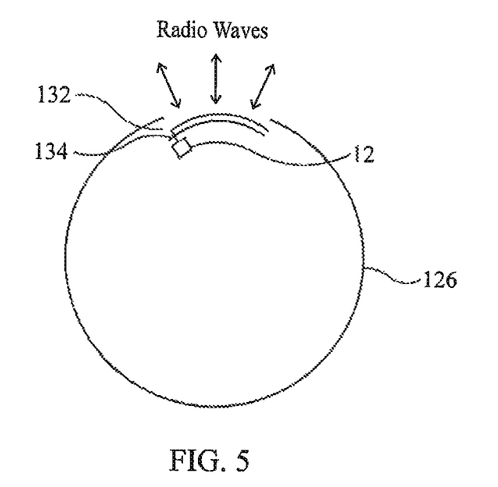
FIG. 5 is a schematic end view illustration of a bolt carrier depicting an RFID tag assembly affixed thereto.

With reference to FIGS. 3-5, a second significant aspect of the present invention involves providing RFID tag 10 with a unique mounting configuration and antenna. FIG. 3 is a schematic top view illustration of carrier body 126. A bore hole 128 is formed in carrier body 126 for receiving the RFID chip 12 within a cavity. In a preferred embodiment a shallow groove, referenced as 129, is formed in carrier body 126 in overlaying relation with bore hole 128. Groove 130 is preferably formed with a depth of approximately 0.150 inches, however, any suitable depth may be used. RFID chip 12 is inserted within bore hole 128, and an antenna assembly, generally referenced as 130, is disposed in overlaying relation therewith. Antenna assembly 130 is preferably formed of a curved sheet of nickel-plated copper 132 mounted to a similarly curved dielectric sheet 134 which is preferably formed of fiberglass epoxy. As illustrated in FIG. 4, the exposed signal-receiving copper is exposed in a window measuring 1.6"×0.18". As seen in FIG. 5, an aperture 136 formed in the dielectric layer allows for passage of an electrical conductor therethrough whereby electrical communication may be established between the signal receiving copper conductor 132 and chip 12. Accordingly, chip 12 is mounted to the carrier body internally, however, electrical communication with the signal receiving conductor of the antenna assembly which has external exposure results in improved signal reception. The sheet of nickel-plated copper 132 may be cut or otherwise formed in a configuration that maximizes signal reception. In accordance with another aspect of the present invention the antenna may be formed into a visually detectable distinctive pattern or shape to provide a visual indication that the firearm is adapted for use with the systems and methods disclosed herein.

Figure 6:
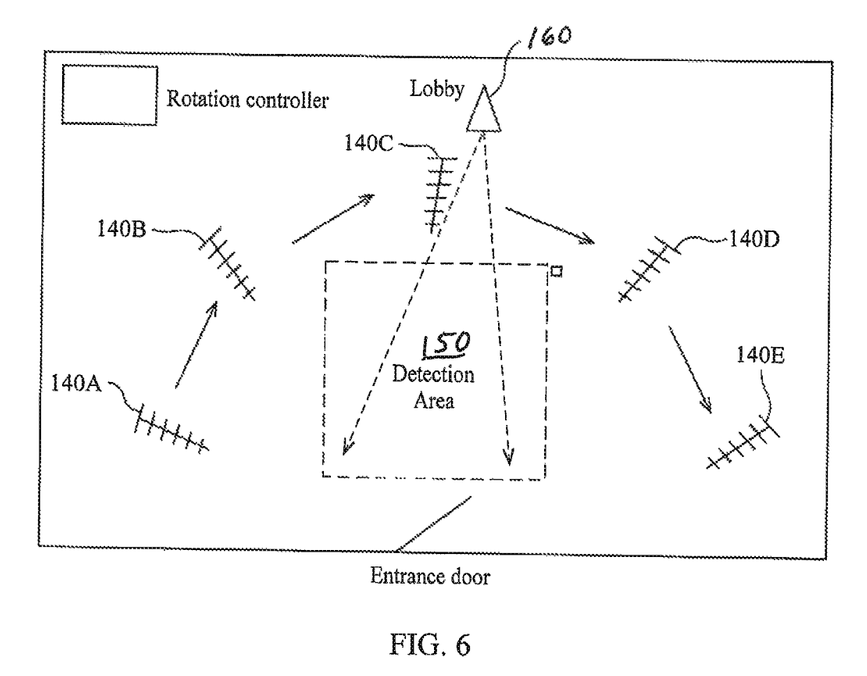
FIG. 6 is a schematic illustration of an area secured by RFID interrogators in accordance with the present invention.

Turning now to FIG. 6, the present invention further includes advancements relating to detection of weapons adapted with RFID tags as set forth above. In accordance with this aspect of the invention, a plurality of RFID interrogators, also referred to as readers, generally referenced as 140A, 140B, 140C, 140D, and 140E, disposed in spaced relation forming an electronic detection perimeter around a detection area/security zone 150. RFID interrogators 140 preferably comprise directional Yagi antennas. Yagi antennas have a main radiating or "driven" element and a plurality of directors mounted to a boom to transmit electromagnetic energy generally in a particular direction. RFID interrogators may be activated by a motion detector 160 or may automatically and periodically activate. As is known in the art, RFID interrogators transmit a radio frequency signals which excite any RFID tags within range causing any tags within range to generate a response signal which is then returned to and received by the interrogator. Excitation of the RFID tag is achieved by harvesting electrical energy or power from the electromagnetic energy transmitted by the interrogator(s). The received signal may be used to trigger one or more security measures such as sounding an alarm, locking doors, contacting law enforcement, etc. Locking doors and controlling other building systems such as lights, HVAC systems etc. can be effective in isolating and/or inhibiting movement of a shooter during a mass shooting event thereby providing valuable time for law enforcement response.

In an alternate embodiment, the present invention may be adapted to disable the firearm upon receipt of an interrogation signal. In accordance with this embodiment, a RFID tag having a battery power source may be required. Upon activation by an interrogation signal the RFID tag will activate a movable mechanism from a retracted first position wherein the firearm operates normally, to a deployed position wherein the firearm is disabled.

A significant aspect of the present invention involves providing a plurality of RFID interrogators and sequentially activating interrogation transmissions such that not all of the interrogators are transmitting simultaneously. Sequential activation of interrogation transmissions allows for the user of a large number of interrogators without the risk of high levels of concentrated electromagnetic radiation exposure for those in the vicinity and increased detection range including various orientations of how the weapon is carried or concealed. The present invention further contemplates flipping the polarity of adjacent and/or every other interrogator antenna.

Figure 7:
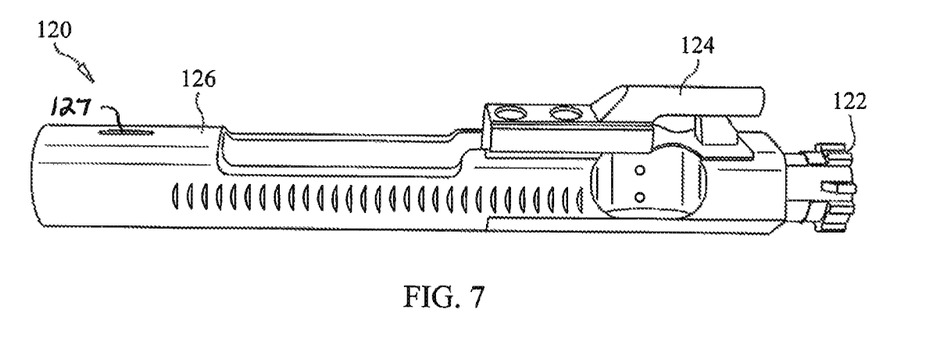
FIG. 7 illustrates a bolt carrier configured with a slotted antenna aperture in accordance with the present invention.

In accordance with an alternate embodiment, the present invention provides a sub flush ultra-thin 10 Ghz on-metal mounted RFID chip. FIG. 7 illustrates a bolt carrier 120 which includes a bolt assembly 122, a gas key 124, and a carrier body 126. A slotted aperture 127 is defined in the bolt carrier body 126 and functions as a slot antenna In a preferred embodiment, for use with 10 Ghz applications the slot antenna 127 has approximate dimensions of/inch in length and 0.03 inches wide. Once the slotted aperture 127 is formed into the metal bolt carrier an RFID chip is affixed below and/or embedded within the external surface of the bolt carrier below and in alignment with the slotted aperture 127 as further illustrated in FIGS. 8 and 9.

Figure 8:
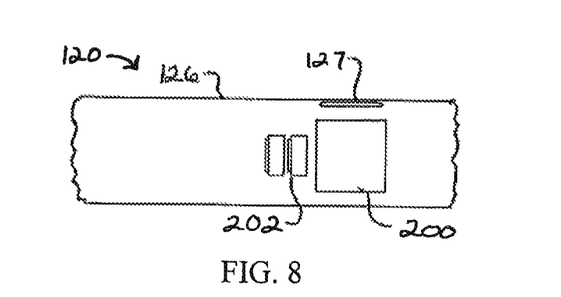
FIG. 8 is a schematic illustration of a battery powered 10 Ghz RFID tag in accordance with the present invention.

FIG. 8 illustrates a battery powered RFID chip, generally referenced as 200. RFID chip is mounted below and/or embedded within the external surface of the main body 126 of bolt carrier 120 below and in alignment with the slotted aperture 127. RFID chip 200 comprises an application-specific integrated chip (ASIC) enabled with 10 Ghz wireless communications, a frequency which significantly is approximately 10 times higher than typical 900 Mhz RFID chips. A significant advantage is realized by using a 10 Ghz RFID chip because that frequency bounces off reflective surfaces very effectively. Also, a much smaller reflective surface is required when operating at 10 Ghz than the amount of reflective surface required when operating at lower (e.g. 900 Mhz) frequencies. As a result, the slotted aperture antenna 127 can be 10 times smaller than that required for 900 Mhz devices. RFID chip 200 preferably comprises an ASIC chip and in a battery powered embodiment, chip 200 may receive electrical power from a battery power source 202.

Figure 9:
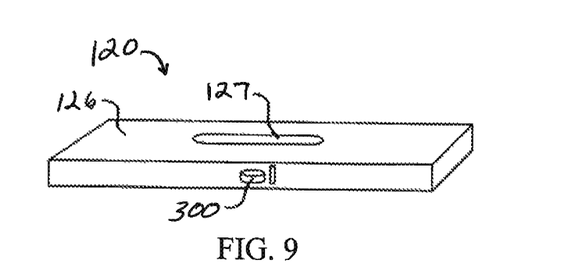
FIG. 9 is a schematic illustration of a passive 10 Ghz RFID chip in accordance with the present invention.

FIG. 9 illustrates another embodiment RFID chip, generally referenced as 300. RFID chip 300 preferably comprises an ASIC chip and is mounted below and/or embedded within the external surface of the main body 126 of bolt carrier 120 below and in alignment with the slotted aperture 127. RFID chip 300 is configured to harvest energy from electromagnetic signals transmitted by interrogators 140. Once the ASIC chip has harvested sufficient energy it will power up and perform a transmitter check to confirm that the transmitter is valid, and if certain conditions are met it will respond by transmitting a wireless response signal. Harvesting energy from electromagnetic signals generated by the interrogators eliminates the need for a battery power source. Accordingly, RFID chip 300 is classified as a passive system with no internal power source, instead being powered by the electromagnetic energy transmitted from an RFID interrogator/reader. As a result, the size of RFID chip 300 is minimized by elimination of a battery power source as well as the bulk associated with conventional circuits. Further, the combination of a 10 Ghz ASIC chip configured with a slotted aperture 127 in an on-metal application has been found to operate effectively to ranges of approximately 30 feet from an interrogator.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system for detecting a firearm in proximity to a security zone, said system comprising:
    the firearm including a bolt carrier;
    said bolt carrier having an external surface defining a slotted aperture;
    an RFID tag embedded within said bolt carrier and disposed below and in alignment with said slotted aperture, whereby said slotted aperture functions as a slot antenna of said RFID tag;
    said RFID tag enabled for wireless communication with a plurality of RFID interrogators using said slot antenna at a frequency of approximately 10 Ghz;
    the plurality of RFID interrogators disposed in proximity to the security zone;
    said RFID interrogators configured to intermittently emit interrogation signals in sequential order, thereby minimizing concentration of electromagnetic radiation of said interrogation signals;
    said RFID tag harvesting electrical energy from at least one of said interrogation signals and generating a wireless response transmission via said slot antenna in response thereto; and
    said wireless response transmission to at least one of said RFID interrogators triggering at least one security measure of said system indicative of the firearm in proximity of the security zone.

2. The system for detecting the firearm according to claim 1 wherein said RFID tag comprises an ASIC chip configured for the wireless communication with the plurality of RFID interrogators.

3. The system for detecting the firearm according to claim 1 further including a motion detector in proximity to said security zone, said motion detector activating said plurality of RFID interrogators upon sensing motion from said motion detector.

4. The system for detecting the firearm according to claim 1 wherein said plurality of RFID interrogators include Yagi antennas.

* * * * *

UNITED STATES PATENT AND TRADEMARK OFFICE
CERTIFICATE OF CORRECTION

| | |
|---|---|
| PATENT NO. | : 11,162,750 B1 |
| APPLICATION NO. | : 17/022331 |
| DATED | : November 2, 2021 |
| INVENTOR(S) | : Donald L. Weeks and Randy Karr |

It is certified that error appears in the above-identified patent and that said Letters Patent is hereby corrected as shown below:

In the Specification

On Column 2, Line 50, change "%" to read "1/2".

Signed and Sealed this
Sixteenth Day of July, 2024

*Katherine Kelly Vidal*

Katherine Kelly Vidal
*Director of the United States Patent and Trademark Office*